United States Patent
Schwemin

[15] 3,677,618
[45] July 18, 1972

[54] BINOCULARS HAVING STABILIZING REFLECTORS

[72] Inventor: Arnold J. Schwemin, Oakland, Calif.

[73] Assignee: Optical Research and Development Corporation, Oakland, Calif.

[22] Filed: Sept. 28, 1970

[21] Appl. No.: 75,906

[52] U.S. Cl. .............................. 350/16, 350/35, 350/173, 356/148

[51] Int. Cl. ...................................................... G02b 23/00

[58] Field of Search ............... 350/16, 34, 35, 28; 33/46.5; 356/148, 149, 248, 250

[56] References Cited

UNITED STATES PATENTS

| | | |
|---|---|---|
| 921,773 | 5/1909 | Wild.............................350/16 UX |
| 2,944,783 | 7/1960 | Macleish et al...................350/16 X |

FOREIGN PATENTS OR APPLICATIONS

| | | |
|---|---|---|
| 439,781 | 12/1967 | Switzerland...........................350/35 |
| 648,292 | 1/1951 | Great Britain.........................350/35 |

Primary Examiner—David Schonberg
Assistant Examiner—John W. Leonard
Attorney—Townsend and Townsend

[57] ABSTRACT

An optical instrument is disclosed having a single light input, paired variable ocular outputs and a folded and split light path therebetween. Provision is made in the folding of the light path for the insertion of a stabilizing mirror to remove apparent image vibration due to ambient instrument vibration.

3 Claims, 5 Drawing Figures

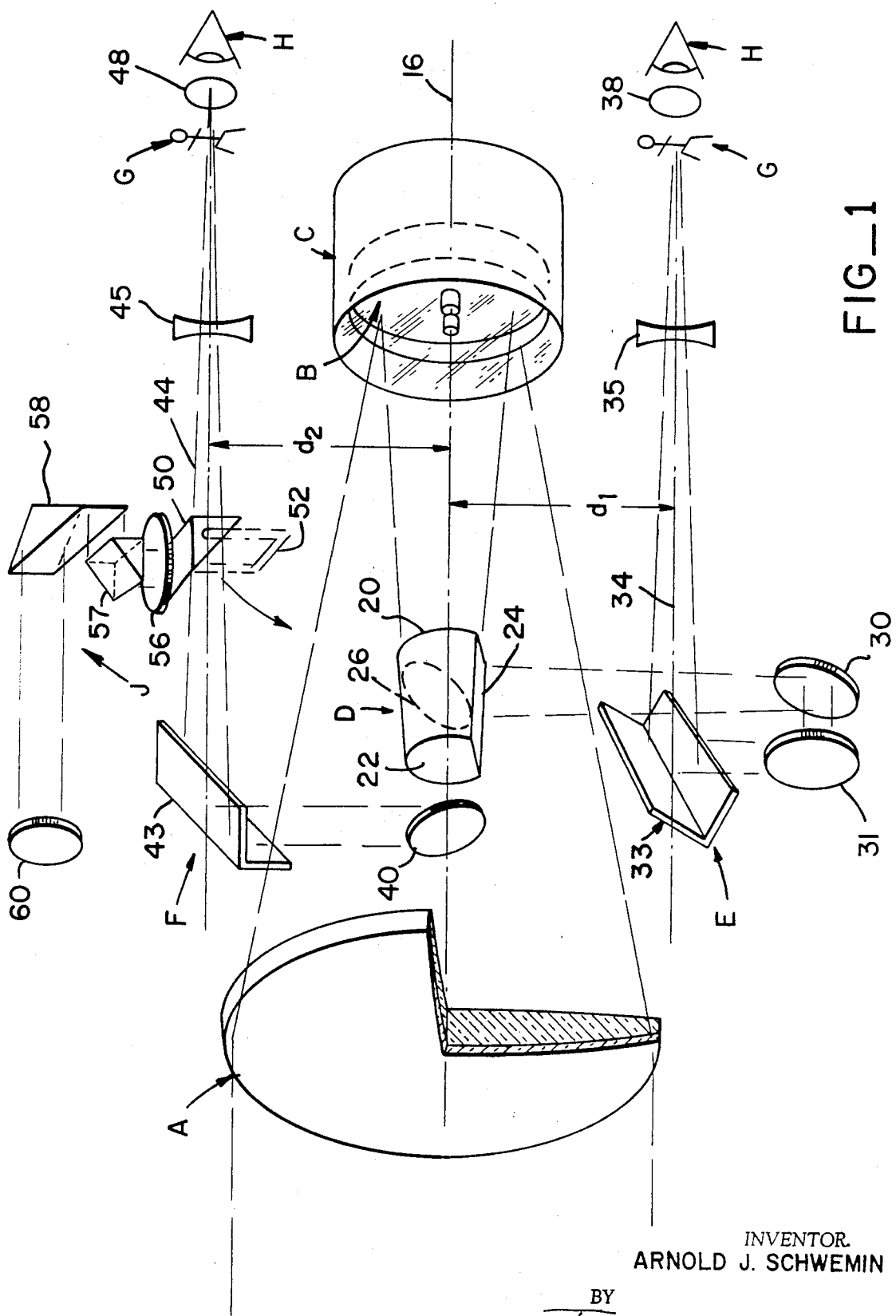

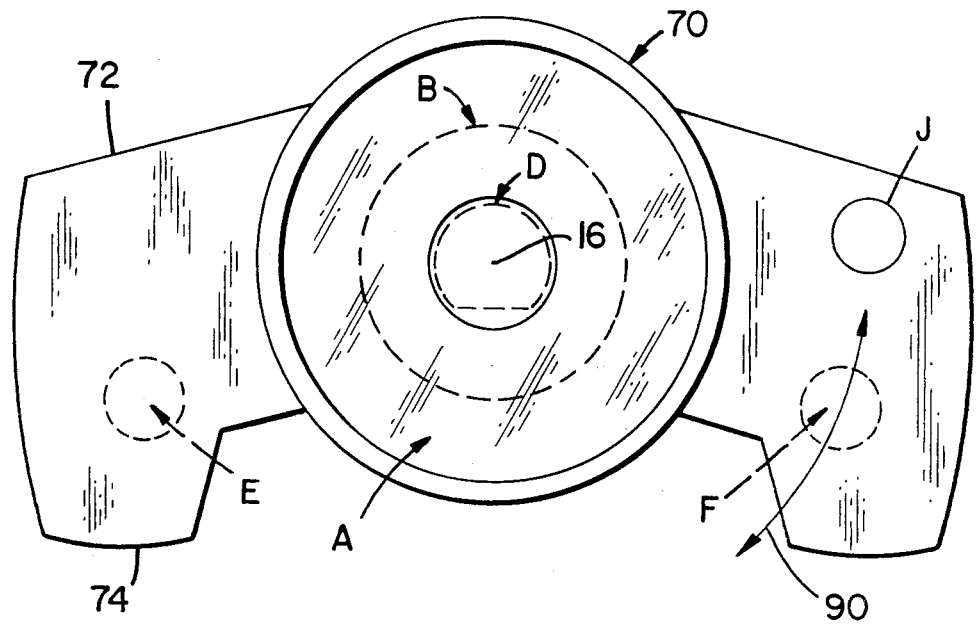
FIG_2
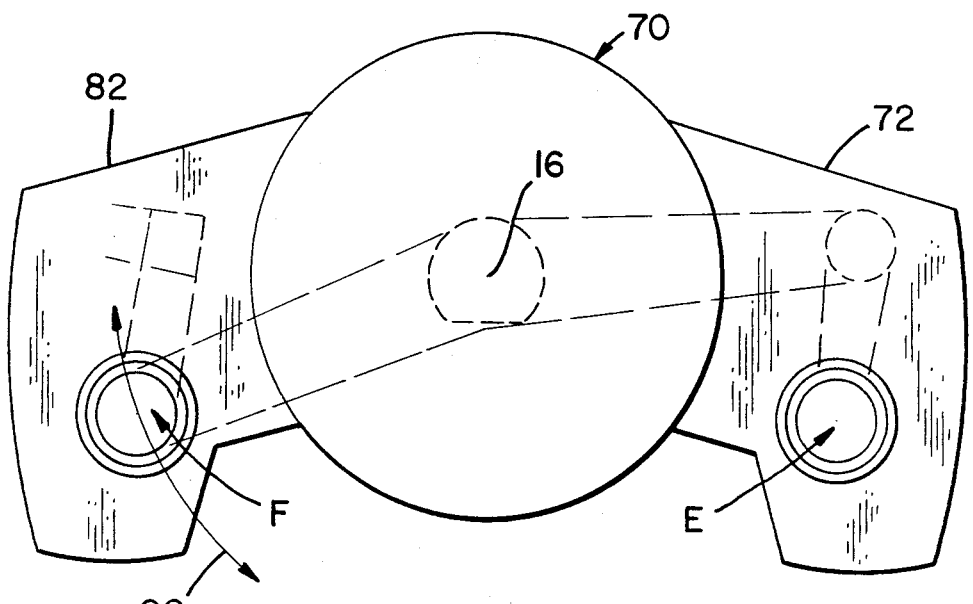
FIG_3
INVENTOR.
ARNOLD J. SCHWEMIN
BY
*Townsend and Townsend*
ATTORNEYS

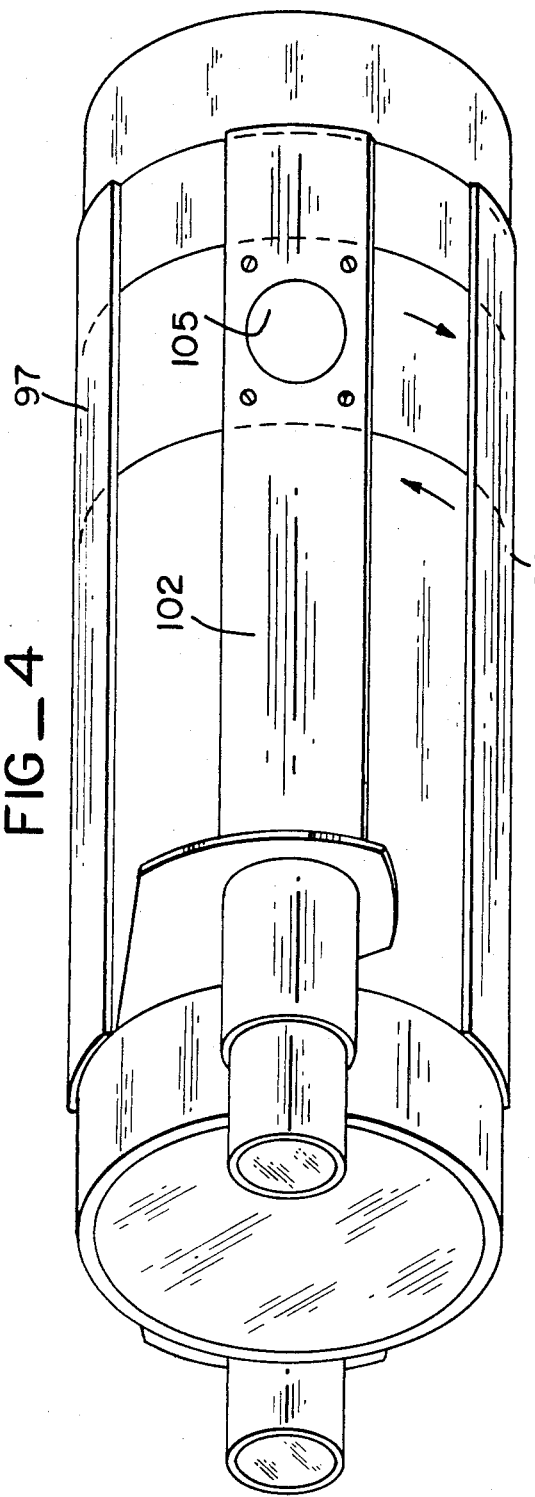
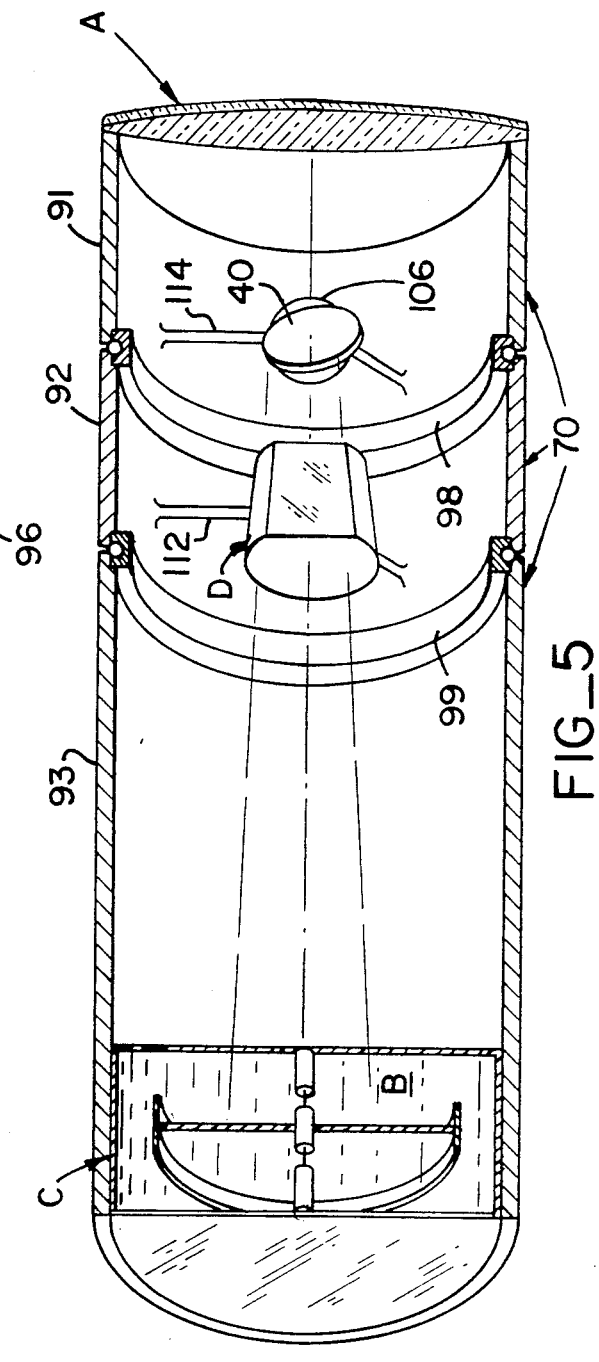
INVENTOR.
ARNOLD J. SCHWEMIN
BY
Townsend and Townsend
ATTORNEYS 3,677,618

BINOCULARS HAVING STABILIZING REFLECTORS

This invention relates to telescopes and more particularly discloses a telescope having a single optical input, paired and spatially variable ocular outputs and a mirror mounted to both fold the light path and effect its stabilization. stabilization, High powered hand held telescopes using mirror folded light paths are known. This disclosure utilizes a light path folding mirror which at the same time can be used to stabilize the instrument image. The primary purpose of this invention, therefore, is to provide an optimum telescope design around the Mirror Stabilizer Having Space Reference Motion described in patent application Ser. No. 75,965, filed 28 Sept.1970.

It is an object of this invention to provide a hand held high powered telescope having a folded light path and paired ocular outputs. Accordingly, a single objective converges light towards a mirror. The light is retrodirected at the mirror to a beam splitter which thereafter provides first and second ocular light paths. These ocular light paths in turn are retrodirected to each of the two eyes of the viewer.

An advantage of this folded light path is that the overall instrument length is reduced; the optical instrument can be conveniently held by a viewer.

Another advantage of this folded light path is that the focal length of the objective is long. A high focal length to lens diameter ratio (f number) can be obtained with resultant reductions in distortions.

A further object of this invention is to provide spatially variable ocular outputs. According to this aspect of the invention, each of the two ocular outputs is constructed for rotation about the axis of the single telescope barrel input.

An advantage of this aspect of the invention is that the paired ocular outputs of this instrument can be conveniently hinged with respect to the central light receiving telescope barrel to provide for variable ocular spacing.

A further advantage of this invention is that each rotatable ocular housing provides a surface not unlike the surfaces on each barrel of a binocular; the instrument can be conveniently and conventionally held by the viewer at these paired housing surfaces.

Yet another advantage of this invention is that instrument symmetry is preserved in all positions of ocular spacing.

Still another advantage of this invention is to provide for the mounting of a stabilizing mirror to stabilized images where the power of the optical instrument exceeds eight and is typically in the range of 18 to 20 power.

An advantage of this mirror is that it can be simultaneously used to both retrodirect the light path and stabilize ambient vibrations in the instrument which may cause apparent image movement.

Yet another advantage of this invention is that the stabilizing mirror and its stabilizing fluid bath can be placed at a position where the weight of the mirror and bath does not cause serious instrument imbalance.

Still another object of this invention is to provide a finder telescopic path of lower power.

An advantage of the finder telescopic path is that searching with the limited field of a high power optical instrument can be avoided.

Other objects, features and advantages of this invention will be more apparent after referring to the attached drawings and following specification in which:

FIG. 1 is an exploded perspective view of the optics of this invention illustrating the single light input, a retro-directing stabilizing mirror, a beam splitting output having two oculars of variable spacing;

FIG. 2 is a front elevation view illustrating the single optical input;

FIG. 3 is an end elevation view illustrating the instrument of this invention from the ocular output side;

FIG. 4 is a perspective view of a partial instrument assembly which illustrates a pivotal movement of the ocular optical paths relative to one another; and FIG. 5 is a perspective view of a section of the instrument assembly shown in FIG. 4.

With reference to FIG. 1, the optics of this invention are schematically shown in a partially exploded view. Objective A of positive power is shown focusing collimated light from an object (not shown) onto a mirror B. Mirror B is typically supported in a windowed chamber C which is filled with fluid. The fluid, acting on both the sidewalls of the chamber and the surfaces of the mirror, causes the mirror to undergo proportional angular motion with respect to an inertial reference system when the chamber and optical instrument are subjected to vibrational angular motion with respect to the referenced system. This mirror is of the type described in MIRROR STABILIZER HAVING SPACED REFERENCED MOTION, patent application Ser. No. 75,965, filed 28 Sept. 1970.

From mirror B the converging light rays are retro-directed to a beam splitter D. Beam splitter D divides the light rays sending one-half of the light output from mirror B to a first ocular path E and the second half of the light output to a second ocular path F. At ocular paths E and F the image is focused on paired imaging planes G for viewing by a viewer schematically shown at eyes H. A finder telescope J is shown schematically interrupting ocular light path F.

Throughout the following specification, some reference will be made to specific dimensions. It will be understood that this reference to dimensions is merely illustrative of the preferred embodiment of this invention and is in no way intended to limit this invention.

Objective lens A is a positive lens, preferably of 60 millimeters diameter having a flocal length of 370 millimeters. It is thus seen that the focal length to lens diameter ratio (f number) is in excess of six. This f number in excess of six enables many optical distortions associated with shorter focal lengths to be minimized. These distortions include astigmatism, chromatic aberation and curvature of field.

Mirror B, in addition to stabilizing the light path as described above, retrodirects the light path backwardly and upon itself. This retrodirection is normally concentric to axis 16, the axis extending centrally through objective lens A and to circular mirror B.

Light from mirror B is received at a beam splitter assembly D. Typically, beam splitter D is of an overall quasi cylindrical or mail box shape having front plane surface 20, rear plane surface 22 and side plane surface 24.

Beam splitter D is typically a solid piece of glass. This glass has within it a conventional beam splitting layer 26. Layer 26, embedded within the glass, typically consists of a sequence of dielectric materials which are disposed in a plane obliquely inclined to axis 16. This oblique plane of dielectric materials causes approximately 50 percent of the light rays to be reflected at right angles to axis 16 normally through plane surface 24 of beam splitter D. The remainder of the light rays pass through the oblique plane of dielectric material without deflection and pass through window 22 concentrically along axis 16.

Having set forth the construction of beam splitter D the construction of each of the ocular paths E and F can now be described.

Ocular light path E commences at plane surface 24 and is periscoped at mirrors 30 and 31 onto roof mirror 33. Roof mirror 33 is of conventional construction and consists of two reflecting surfaces disposed at right angles to one another. This mirror retrodirects the light of ocular light path E along an axis 34 which is parallel to axis 16.

The light as retrodirected by the roof mirror 33 passes through a negative lens 35 which slightly extends the imaging plane G beyond the otherwise normal 370 Millimeter focal length of objective A. In actual practice, negative lens 35 extends the focal path approximately 3 centimeters.

It should be pointed out that the mirrors which form ocular light path E serve to restore the horizontal and vertical image parity of this telescope to the real world image parity of the object viewed. Reflecting surfaces 26, 30, 31 and 33 form an even number of reflecting surfaces restoring vertical image parity. Similarly, roof mirror 33 with its two reflecting surfaces restores horizontal image parity. Thus, the image appearing at plane G has the same alignment as the real world object being viewed.

Typically, the real image at plane G is viewed through an eyepiece 38 by the eye of the viewer H. Eyepiece 38 is conventional and will not be further discussed.

The second ocular path F is similar to the light path E with the exception that the number of mirrors is reduced by two. It commences at mirror 40 which directs the converging rays normally outward from axis 16 onto a roof mirror 43. Roof mirror 43 folds the light along an axis 44 which is parallel to the axis 16. The light as reflected from roof mirror 43 passes through a negative lens 45 and onto an imaging plane G. Just as negative lens 35 of light path E extends the focal length of objective A, negative lens 45 in second ocular light path F extends the focal length of objective A. Eyepiece 48 enables eye H of the viewer to see the real image at plane G.

Several important observations can be made about ocular light paths E and F. First, the axis 34 of first ocular light path E is separated by a distance $d_1$ from axis 16. Similarly axis 44 of second ocular light path is separated from axis 16 by a distance $d_2$. These distances $d_1$ and $d_2$ are identical. As will hereinafter more fully appear, this spatial separation between the parallel axes 16, 34 and 44 permits a variable ocular separation between the respective eyepieces 38 and 48. Instrument symmetry with variable ocular separation is achieved.

Secondly, the four legged light path through objective lens A to eyepiece 38, is exactly the same optical distance as the two legged light path through objective lens A to eyepiece 48. Refractive material in each optical path may be varied to help achieve an equal optical path to each eyepiece. Moreover, eyepiece 38 and eyepiece 48 are mounted in parallel planes. Thus it can be seen that this instrument can be conveniently viewed by both eyes H of an observer.

The variable ocular spacing between first ocular light path E and second ocular light path F can be easily understood. Typically, beam splitter D, mirrors 30, 31, 33, lens 35 and eyepiece 38 are all simultaneously rotated about axis 16 between objective A and mirror B. Thus the spatial separation between eyepiece 48 on one hand and eyepiece 38 on the other hand can be changed. Naturally viewers having differing spatial separation of their eyes H can use the telescope or monobinocular of this invention.

It should be noted at this juncture that mirror 40 and beam splitter D will partially obstruct some of the converging light focused between objective A on one hand and mirror B on the other hand. This obstruction, however, is not critical. As long as the resultant pupil from the shadow of mirror 40 and beam splitter D received through eyepiece 38, 48 is substantially smaller than the pupil of the eyes of the viewer at H, no bothersome interruption of view will occur.

One important limitation of the installation of a stabilizing mirror B in this invention should be noted. Where a single mirror, stabilized in two degrees of motion each orthogonal to axis 16 is utilized, it is necessary that the mirror be mounted on the objective side of the light path before beam splitter D. Without such a location of the mirror B, synchronized and separate stabilizing mirrors would be required. As their mechanical linkage can be extremely complex, it is immediately seen that the single mirror B of this invention produces an extremely convenient optical stabilizing arrangement.

It has been found convenient to use a finder telescope J with this invention. Typically, when optics in the range of 20 power are used, the angular field of the viewer is vastly reduced. In trying to initially find a small distant object, such as an airplane in the sky, extensive hunting is frequently required.

Accordingly, a 3 power finder telescope J is commonly used with this invention. Typically, a prism 50 pivotally mounted about an axis 52, is mounted for movement into and out of a position along second ocular path F. Prism 50, when interposed into ocular path F causes light to be received from a three power objective 56, and blocks light from objective A.

Light from objective 56 is folded at right angles by a first prism 57 and thereafter folded at right angles by a poroprism 58 through a window 60 in the housing for the second ocular path F. Naturally, target cross hairs and the like can be provided for the centering of an image within the train of finder telescope J.

It can thus be seen that with two powered finder telescope J engaged, one eye of the viewer can be used to locate and thereafter center a small distant object. Thereafter, prism 50 can be pivoted about axis 52 out of second ocular light path F. When this is done, both eyepieces 38 and 48 will receive the magnified and stabilized image through the monobinocular of this invention.

Referring briefly to FIGS. 2, 3, 4 and 5, the actual housing of the optics of this invention can be easily understood. Typically, objective A, mirror B and its chamber C, beam splitter D and first ocular light path E are all fixedly mounted to a cylindrical housing 70. It will thus be seen that no relative rotational motion will occur between objective A and first ocular light path E.

Ocular light path E is contained within a housing 72. Typically, housing 72 extends outwardly and to one side of cylindrical housing 70 and is rigidly attached thereto.

Second ocular light path F is contained within a housing 82. As can be seen from both FIGS. 2 and 3, housing 82 is precisely symmetrical to housing 72 about the axis 16 of the optical instrument here illustrated.

It should be noted that housing 72 on one hand and housing 82 on the other hand provide for convenient instrument gripping. Just as a conventional binocular is gripped at its paired and symmetrical barrels, the instrument of this invention can be gripped at its paired and symmetrical housings 72 and 82.

Moreover, it will be seen that the weight distribution of this instrument will be evenly and centrally distributed between the housings 72, 82 at all ocular separations.

Rotational motion of housing 82 and its ocular path F to housing 72 and its ocular path E is effected about the out-side surface of the cylindrical housing 70. This can best be seen by referring to the partial instrument assembly illustrated in FIG. 4 and 5.

In FIG. 5 it will be seen that barrel 70 comprises three cylinder segments 91, 92 and 93 placed coaxially in end-to-end relation. These cylinder segments are each of similar cross-section. Cylinder segments 91 and 93 are fastened together by longitudinally extending arcuate strips 96 and 97 shown in FIG. 4 and are spaced to accommodate cylinder segment 92 therebetween.

Cylinder 92 is free to rotate with respect to cylinders 91 and 93. This cylinder is maintained in its coaxial relation relative to cylinders 91 and 93 by rings 98 and 99. These rings are commonly grooved and notched to fit complementary grooves and notches in the respective cylinders 91, 92 and 93. Optics for ocular path E are typically fastened to a strip 102 of arcuate cross-section which extends longitudinally of cylinder 70 and fastens to the cylinder at cylindrical section 92. This fastening is commonly effected by means of set screws.

It will be seen that both strip 102 and the underlying portion of cylinder segment 92 each define overlying apertures 105. These apertures 105 enable the optical path projected from beam splitter D to pass through the cylinder and strip and onto the remaining optics of ocular path E which are affixed to and supported by strip 102. Similarly, cylinder section 91 also includes an aperture 106. This aperture 106 extends to the ocular path F which is supported on cylinder sections 91 and 93.

Beam splitter D is typically supported centrally of cylinder segment 92 by a series of spokes 112. Typically, these spokes are of such a dimension so as to not seriously impair the optical path between objective A and mirror B. Likewise, mirror 40 is supported on a series of spokes 114 anchored to cylinder section 91.

It can thus be seen as the ocular paths E and F are rotated relative to one another, the beam splitter D and mirror 40 undergo corresponding rotation. Mounting of the remaining optics of ocular paths E and F is obvious. For this reason, they will not be further discussed herein.

It should be apparent to those skilled in the art that this invention will admit of numerous embodiments. For example the powers of the telescope could be changed. Similarly, the fluid stabilized mirror of this invention could be substituted with a gyroscope stabilized or gyroscope linked and moved mirror. Moreover, each of the optical paths could have its overall magnification easily changed at differing locations. Likewise other modifications can be made to this invention without departing from the spirit and scope.

What is claimed is:

1. A hand held optical instrument comprising: an objective for providing a converging light path; a mirror located in said light path for retrodirecting said converging light path toward said objective; means for mounting said mirror for combined stabilizing pivotal motion relative to two axes, each axis being orthogonal to both the light path between said objective and mirror and the remaining axis; beam splitter means between said objective and mirror and within said retrodirected light path for providing first and second ocular paths; and means for periscoping away from said beamsplitter a portion of each of said ocular paths along path portions substantially parallel to and separate from the path between said objective and mirror.

2. The invention of claim 1 and wherein said path portions are mounted for relative rotation about an axis between said objective and mirror.

3. The invention of claim 1 and wherein each of said path portions is equidistant from and parallel to a portion of the light path between said objective and mirror.

* * * * *